Patented Sept. 13, 1927.

1,642,595

UNITED STATES PATENT OFFICE.

GRIGORI PETROFF, OF MOSCOW, RUSSIA, AND PETER SHESTAKOFF, OF PARIS, FRANCE.

PROCESS FOR OBTAINING SULPHO-AROMATIC FATTY ACIDS.

No Drawing. Application filed December 30, 1925, Serial No. 78,490, and in Germany May 18, 1925.

This invention relates to processes of preparing sulpho-aromatic fatty acids and it comprises a process in which impure sulpho-aromatic fatty acids, prepared by the usual sulphonation of a mixture of aromatic hydrocarbons and fatty acids, are dissolved in an organic solvent immiscible with water and the sulpho-aromatic acids in a pure state thereafter recovered from said solution by extracting the solution with a water solution of a water soluble solvent.

It is customary to prepare sulpho-aromatic fatty acids for fat splitting purposes by sulphonating a mixture of aromatic hydrocarbons and fatty acids and, after removal of excess sulphuric acid, the dark brown mass remaining is used without further treatment. The material so prepared is the well known Twitchell reagent and it is a complex mixture of water, sulpho derivatives of fatty acids and never containing more than about 50 per cent of sulpho aromatic fatty acids, that is, material having emulsifying and hydrolyzing properties.

The presence of such a large percentage of inactive material reduces not only the effectiveness of the fat splitting material but has the further disadvantage that the fatty acids prepared by the use of the hydrolyzing agent are colored to a marked degree. The fatty acids so prepared are contaminated with impurities derived from the fat splitting reagent.

Numerous methods have been proposed to overcome the difficulties attending the use of the fat splitting agent prepared by simple sulphonation and removal of excess sulphuric acid. It has been suggested to neutralize the sulphonation product, that is, the ordinary Twitchell reagent, with an alkali, the neutralized product being then washed with a solution of sodium chloride and extracted with ether. Finally, the purified material was converted into heavy metal salts and used as such to split fats. Because of the emulsifying properties of the alkali salts of fatty acids and aromatic sulphonic acids, this proposed method of purification is technically very difficult. Moreover, the product finally obtained does not have the good fat splitting properties possessed by the free sulpho-aromatic sulphonic acid.

It is an object of the present invention, to prepare sulpho-aromatic fatty acids in an uncontaminated condition which do not cause the formation of colored fatty acids during the fat splitting process.

We have found that sulpho-aromatic fatty acids prepared in the usual way by sulphonating a mixture of aromatic hydrocarbons and unsaturated fatty acids or turpentine oils, may be purified by dissolving them in an organic solvent immiscible with water, such as petroleum, benzine, benzol, toluol, carbon tetrachloride and other solvents immiscible with water and thereafter extracting the sulpho-aromatic fatty acids by treating the solution with a water solution of methyl alcohol, ethyl alcohol, acetic acid, formic acid, acetone, or other solvent miscible with water. By this treatment, the sulpho-aromatic fatty acids, having a preferential solubility in the water solution, go over into the water layer which, after stratification, may be easily separated from the water-immiscible solvent and the sulpho-aromatic fatty acids recovered by evaporation.

Example.

A mixture of 65 parts of crude oleic acid, 25 parts of naphthaline and 10 parts of benzene are sulphonated with 150 parts of concentrated sulphuric acid. The temperature is kept below 75° C. The reaction product is then mixed with an equal quantity of water, the lower sulphuric acid layer removed, and the upper layer (sulphonic acids) washed with a mixture of sodium chloride or sodium sulphate solution, benzine and benzol. The sulpho acids are thereby dissolved in the benzine and benzol and the so prepared solution is washed with 15 per cent sodium sulphate solution and 5 per cent acetic acid solution to remove any traces of sulphuric acid or aromatic sulphonic acids. The benzine-benzol solution of the sulpho-aromatic fatty acids is then mixed with 100 parts of a 10 per cent solution of ethyl alcohol and allowed to stand for 8 to 10 hours at a temperature of about 50° C. to 60° C. Thereafter, the water-alcohol layer, now containing the sulpho-aromatic fatty acids, is separated from the oily layer and washed 2 or 3 times with benzine. On evaporation of the water layer, a residue of pure sulpho-aromatic fatty acids is obtained which possess excellent fat-splitting properties without contaminating the fatty acids produced during the splitting.

What we claim is:

1. In the process of preparing sulpho-aromatic fatty acids for use in splitting fats, the step which comprises dissolving the impure sulpho-aromatic fatty acid, prepared by the usual sulphonation process, in an organic solvent immiscible with water and thereafter extracting the sulpho-aromatic fatty acid from the so-prepared solution by treating the solution with a water solution of a water soluble solvent.

2. In the process of preparing sulpho-aromatic fatty acids for use in splitting fats, the step which comprises dissolving the impure sulpho-aromatic fatty acids, prepared by the usual sulphonation process, in a mixture of benzine and benzol, extracting the sulpho-aromatic fatty acids from the so-prepared solution by adding a water solution of a low molecular weight alcohol to said solution, allowing the mixture to stand, separating off the water layer containing the sulpho-aromatic fatty acids in solution and thereafter recovering the sulpho-aromatic fatty acids from said water solution.

In testimony whereof we affix our signatures.

GRIGORI PETROFF.
PETER SHESTAKOFF.